(12) United States Patent
Post

(10) Patent No.: US 10,138,938 B2
(45) Date of Patent: Nov. 27, 2018

(54) PASSIVE MAGNETIC BEARING ELEMENTS AND CONFIGURATIONS UTILIZING ALTERNATIVE POLARIZATION AND AMPERIAN CURRENT DIRECTION

(71) Applicant: Lawrence Livermore National Security, LLC, Livermore, CA (US)

(72) Inventor: Richard F Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 309 days.

(21) Appl. No.: 15/007,156

(22) Filed: Jan. 26, 2016

(65) Prior Publication Data

US 2017/0016477 A1 Jan. 19, 2017

Related U.S. Application Data

(60) Provisional application No. 62/191,885, filed on Jul. 13, 2015.

(51) Int. Cl.
*H02K 7/09* (2006.01)
*F16C 32/04* (2006.01)

(52) U.S. Cl.
CPC ................ *F16C 32/0429* (2013.01)

(58) Field of Classification Search
CPC ........ F16C 32/0429; H02K 7/09; H02K 11/01
USPC ....................................... 310/90.5
See application file for complete search history.

(56) References Cited

U.S. PATENT DOCUMENTS

| | | |
|---|---|---|
| 4,755,709 A | 7/1988 | De Jager |
| 4,812,694 A | 3/1989 | Fremerey |
| 5,495,221 A | 2/1996 | Post |
| 5,710,469 A | 1/1998 | Ries |
| 5,783,885 A | 7/1998 | Post |
| 5,847,480 A | 12/1998 | Post |
| 5,894,181 A | 4/1999 | Imlach |
| 6,111,332 A | 8/2000 | Post |
| 6,191,515 B1 | 2/2001 | Post |
| 6,770,993 B1 | 8/2004 | Heshmat et al. |
| 6,867,520 B2 | 3/2005 | Jennings |
| 6,965,181 B1 | 11/2005 | Heshmat et al. |
| 7,872,553 B2 | 1/2011 | Fremerey |
| 7,876,010 B2 | 1/2011 | Post |
| 8,823,233 B2 | 9/2014 | Post |

(Continued)

OTHER PUBLICATIONS

International Search Report and Written Opinion for PCT/US16/038523, corresponding to U.S. Appl. No. 15/007,156, 10 pages.

*Primary Examiner* — Forrest M Phillips
(74) *Attorney, Agent, or Firm* — John P. Wooldridge

(57) ABSTRACT

A ferromagnetic shield in contact with a magnet bar at the opposite end from the working surfaces of the bar eliminates the field canceling effects that arise from the Amperian currents at that end. The optimum polarization direction for such bars is one that is parallel to the azimuthal coordinate of the bar. The field at the working surface of the bar approaches that of a bar of infinite length because the shield, located on the side opposite to that of the working surface, completely eliminates, or at least substantially reduces, the field cancellation effect that normally would occur. The magnet bars with shields can be assembled on rotors and stators in flywheel storage systems and other rotating machinery.

18 Claims, 6 Drawing Sheets

(56) References Cited

U.S. PATENT DOCUMENTS

| | | | |
|---|---|---|---|
| 9,197,110 B2 | 11/2015 | Post | |
| 9,270,203 B2 | 2/2016 | Post | |
| 2010/0064929 A1* | 3/2010 | Post | B60L 13/04 104/283 |
| 2013/0028390 A1 | 1/2013 | Kalenyak et al. | |
| 2013/0214631 A1* | 8/2013 | Smith | H02K 1/2766 310/156.07 |
| 2014/0035411 A1* | 2/2014 | Kundel | F16C 32/0423 310/90.5 |
| 2014/0232226 A1* | 8/2014 | Lantto | H02K 7/08 310/90.5 |
| 2014/0353971 A1* | 12/2014 | Davey | F03B 11/06 290/52 |
| 2015/0115756 A1* | 4/2015 | Walsh | F16C 32/0408 310/90.5 |
| 2015/0167734 A1* | 6/2015 | Baudelocque | F16C 32/0468 310/90.5 |
| 2015/0371768 A1* | 12/2015 | Graham | H01F 27/365 320/108 |
| 2016/0102704 A1* | 4/2016 | Post | F16C 32/0404 310/90.5 |

\* cited by examiner

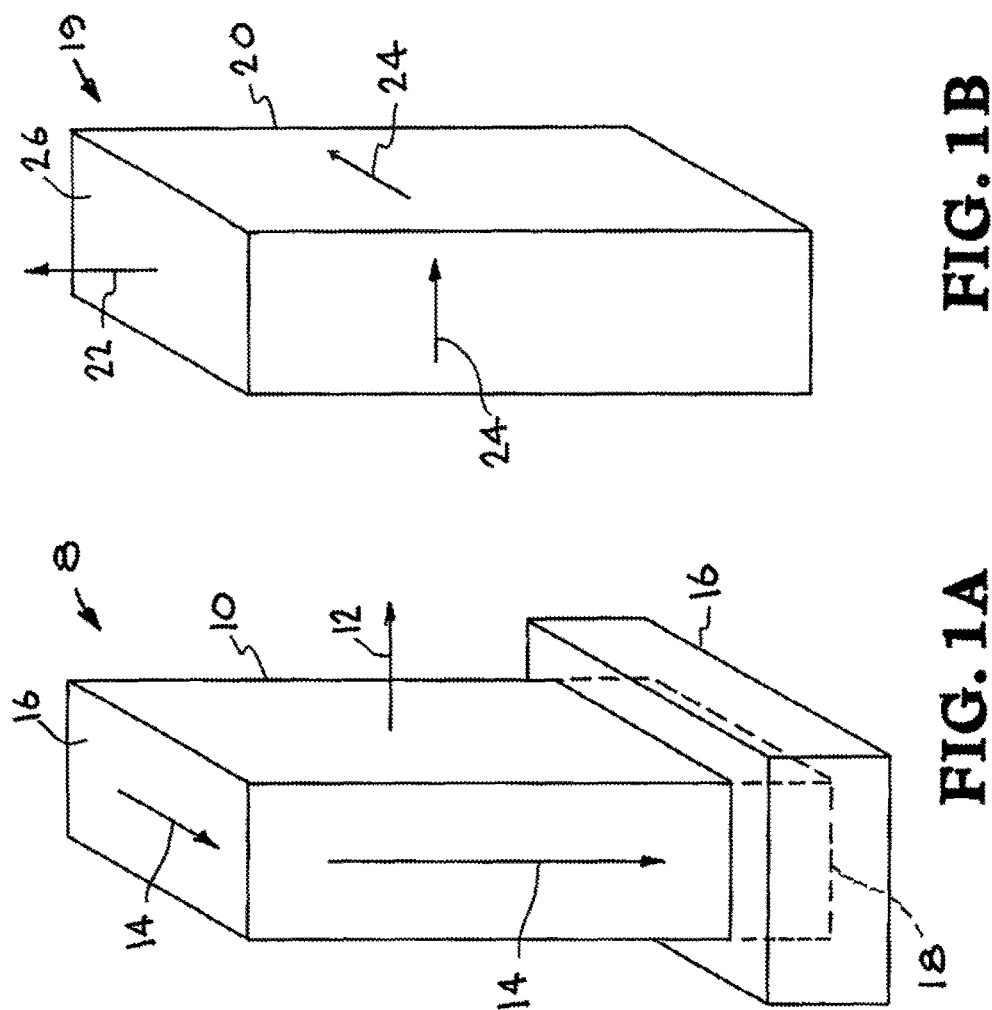

PASSIVE MAGNETIC BEARING ELEMENTS AND CONFIGURATIONS UTILIZING ALTERNATIVE POLARIZATION AND AMPERIAN CURRENT DIRECTION

CROSS-REFERENCE TO RELATED APPLICATIONS

This application claims the benefit of U.S. Provisional Patent Application No. 62/191,885 titled "Improved Levitating Passive Magnetic Bearing Configurations," filed Jul. 13, 2015, incorporated herein by reference.

STATEMENT REGARDING FEDERALLY SPONSORED RESEARCH OR DEVELOPMENT

The United States Government has rights in this invention pursuant to Contract No DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to the design of levitating magnetic bearings of the annular or conical-annular configuration, and more specifically, it relates to the use of alternative polarization and Amperian current directions in levitating passive magnetic bearing configurations.

Description of Related Art

Levitating magnetic bearings of the annular or conical-annular configuration are typically made using rectangular blocks that are assembled in a ring the radius of which is large compared to the dimensions of the bars so that the gaps at the outer edge are small compared to their dimensions. Key elements in the passive magnetic bearing systems developed at Lawrence Livermore National Laboratory (LLNL) are the permanent-magnet arrays that levitate the rotating system, e.g., the rotor of a flywheel energy storage system (EMB). It is therefore of value to consider designs of these systems that minimize the amount of magnet material required (reduces the weight added to the rotor), and reduce the material cost of the bearing, both from reducing the amount of permanent magnet material required to fabricate the bearing and/or to allow the use of less expensive magnet material. For example, the high-field permanent magnet material such as SmCo (Br=1.3 Tesla) and NdFeB (Br=1.4 Tesla) are very expensive ($100/lb for SmCo and $50/lb for NdFeB). Ferrite magnets (Br=0.4 Tesla) cost only $2/lb, and are also non-conducting, so that eddy-current losses are zero. New designs are desirable that improve the lift per unit area of levitating bearings, as compared to former designs, sufficiently as to allow the use of ferrite magnets for levitation of EMBs rotors in most cases. The present invention provides such designs

SUMMARY OF THE INVENTION

The invention consists in adding a ferromagnetic shield at the opposite end from the working surfaces of the magnet bars to eliminate the field cancelling effects that arise from the Amperian currents at that end. It is shown that the optimum polarization direction for such bars is one that is parallel to the azimuthal coordinate of the bar, as opposed to polarization in the radial direction or axial direction. In the present invention, the field at the working surface of the bar approaches that of a bar of infinite length because a shield, located on the side opposite to that of the working surface, completely eliminates the field cancellation effect that normally would occur. The invention has a variety of uses including in flywheel storage systems and other rotating machinery.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 1A shows rectangular permanent magnet block 10 oriented so that its polarization 12 is horizontal with respect to the page.

FIG. 1B shows a conventional bearing having a permanent magnet block 20 and a polarization 22 that is vertical with respect to the page.

DETAILED DESCRIPTION OF THE INVENTION

Figure 1C:
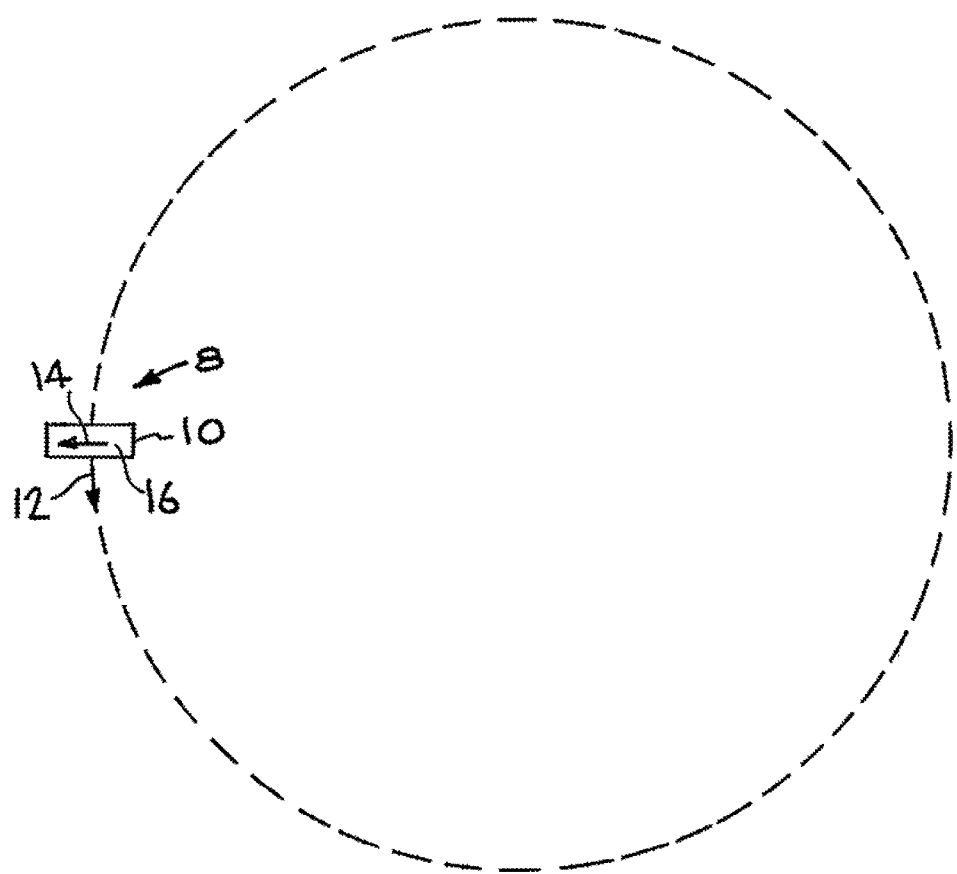
FIG. 1C shows a manner in which the element 8 of FIG. 1A can be arranged in a circular pattern for use in a circular bearing.

The new designs described in this document improve the lift per unit area of levitating bearings, as compared to former designs, sufficiently as to allow the use of ferrite magnets for levitation of EMBs rotors in most cases. Levitating magnet arrays employed in the LLNL passive magnetic bearing systems have consisted of annular or conical-annular arrays of permanent magnets for vertical-axis systems or arc or conical arc arrays for horizontal-axis systems. This document describes an improved form of these arrays that results in a substantial increase in the levitating force per unit magnet weight. As noted above, the improvement is such that in many cases it will allow the replacement of an expensive permanent magnet material, e.g., SmCo, by a much less expensive one, e.g., ferrite.

In the design of the levitating components of a passive magnetic bearing there are two general classes of magnet arrays from which to choose, namely, annular uniformly polarized arrays or Halbach arrays with radially directed periodicity. The Halbach array makes the most efficient use of the magnetic material but at the price of complexity of the individual magnet elements from which it is assembled. They also have very high stiffness per unit area. This feature can make it more difficult to stabilize the entire passive bearing system against Earnshaw-Theorem-related instability.

The new invention achieves typical levitation per unit magnet weight factors that fall short of Halbach array bearings by about a factor of two, but are nevertheless better than previous designs by a factor of two or more, and at the same time involve far simpler magnet elements than do Halbach array bearings.

Returning to the topic of designing annular levitating bearings, it is first of all important to note that there are two generically different approaches that might be taken. These two differ in the polarization direction of the magnets. An annular ring levitation magnet array is typically constructed by assembling small square-ended magnet bars into a circular pattern, having a radial width that is much smaller than the radius of the ring. When this is the case, the gaps between the magnets at the outer edge of the ring are very small compared to the end-on dimension of the blocks so that the effect of these gaps on the magnetic field configuration is minimal. When radially wider rings are required, they can be made up by nesting rings of increasing radius, with small radial gaps between each ring. Conical annular rings can also be assembled in the same manner, as can annular rings located on the inner surface of the rotor that exert an inward force when matched against a cylindrical array of stator magnets.

At this point in the design there are two choices of magnet polarization that can be chosen. The conventional choice of polarizations are ones that are perpendicular to the working surface of the ring, i.e., either "out-out" (repelling), or "out-in" (attracting). The invention described herein consists in choosing the alternative polarization, i.e., parallel or anti-parallel to the azimuthal coordinate of the annular bearing. By making this choice it will be shown that it is possible to double the repulsion or attraction of the bearing relative to the "out-out" or "in-out" polarizations with the same magnet volume and weight of magnets as used in the conventional magnet polarization orientations.

In order to explain the electromagnetic origin of the above-cited advantage (of using a non-conventional choice of magnet polarizations) it is very useful to introduce the "Amperian current" model of a permanent magnet bar. According to this model, any permanent magnet can be represented by a pattern of equivalent current sheets on their surface. For rectangular bars these currents on the surface of the bar are constant in magnitude, closing on themselves to form rectangular current loops. For a magnet bar that is polarized so that the emerging B vector is perpendicular to an end of the bar, the Amperian currents flow around the body of the bar represented by the sides of the bar, just as they would flow in a solenoidal coil with rectangular cross section. The above polarization direction is the one conventionally used to create an attracting or a repelling annular bearing out of small rectangular blocks.

FIG. 1A shows a bearing element 8 comprising a rectangular permanent magnet block 10 oriented so that its B-field polarization 12 is horizontal with respect to the page. Amperian currents flowing around the block are represented by arrows 14. The Amperian currents flowing on the bottom and back side of the block are not shown because they are obscured by the block itself. In this configuration, surface 16 is the working surface of the bearing element. The opposite end of block 10 is located within a trough 18 of a shield 16, which could be made of ferromagnetic material (e.g., soft iron or other high permeability material).

FIG. 1B shows a conventional bearing element 19 having a permanent magnet block 20 and a polarization 22 that is vertical with respect to the page. Amperian currents are represented by arrows 24. In this bearing element, surface 26 is the working surface. FIG. 1C shows a manner in which the element 8 of FIG. 1A can be arranged in a circular pattern for use in a circular bearing. The figure shows a view from above the working surface 16. Although only one of these bearing elements is shown, in a complete bearing, a series of these elements would be placed such that the working surfaces 16 are arranged side-by-side with all of the Amperian currents pointing in the same direction. In the case of FIG. 1C, all of the Amperian current directions are pointed away from the central axis of the circle. If Although not to scale, notice that the thickness of the working surface is small compared to the radius of the circle. Notice also that the magnetic polarization 12 is pointed such that it is parallel with the azimuthal direction of the circle.

The non-conventional polarization choice (i.e., polarization that is perpendicular to two opposing sides of the bar and is parallel to the working surface) has an Amperian current distribution that runs up one side of the bar, across its upper surface and down the opposite side, closing on itself at the other end of the bar. As is the case with parallel wires carrying currents, the Amperian currents on the upper surface of that bar in the rotating annular bearing are repelled by anti-parallel (vectors that lie along parallel lines but point in opposite directions) currents on the surface of a bar element of the stationary annular bearing. Similarly, when the Amperian currents on the upper surface of the bar elements in the rotating annular bearing are parallel to those in the stator annular bearing ring, the force is attractive when the annuli are coaxial.

Based on this disclosure, those skilled in the art will recognize that the non-conventional bearings and the object being supported (e.g., a rotor) can be configured in a variety of ways. For example, a circular bearing can be configured with its Amperian current pointed in one direction and another set of bearing elements can be located on a rotor to be supported by the bearing, the rotor bearings having Amperian current directions anti-parallel to that of the stator bearing. In another embodiment, the support bearing can be located such that its Amperian current direction is parallel to that of the rotor magnetic elements such that the support bearing pulls the rotor upward.

In both cases, but for different reasons, if the above magnet blocks are lengthened or shortened, the strength of the magnetic field above their upper edge will increase or decrease. For the vertically polarized block of FIG. 1B, this variation comes from the fact that the equivalent solenoid has fewer ampere-turns when shortened and vice-versa. For the horizontally polarized bar of FIG. 1A, the magnitude of the Amperian current does not depend on the length of the magnet. However, in this case, where the Amperian current on the bottom edge is oppositely directed to the current across the top edge, the oppositely directed magnetic field produced by that current partially cancels the magnetic field above the bar coming from the top edge, and the cancellation effect is greater the shorter the bar. Note that the Amperian currents that run longitudinally in the bar have no influence on the levitation force since they are orthogonal to the end currents and are also oppositely directed to each other.

The above-described difference in the origin of the length dependence of the magnetic field above the two different magnet blocks opens up an opportunity for a major increase in the magnetic field at the upper surface of one of the bars (the horizontally polarized bar on the left), without increasing its length. As will be described, this means that we can assemble a repelling or attracting annular bearing that, for the same length of magnet bars (and thus the same weight of magnets) can produce levitation forces that in typical cases are approximately a factor of two larger than those achievable with conventional annular magnetic bearings made up of either horizontally or vertically polarized bars.

As the above discussion makes clear, in the case of the horizontally polarized bar, any technique that can shield the field from the transverse Amperian current at the other end of the bar from its effect at the working end of the bar will be nearly equivalent to using a double length bar in the array. One way this shielding could be done would be to locate a trough (e.g., a cylindrical trough) of ferromagnetic material (e.g., soft iron or other high permeability material) at the back end of the annular bearing. This will trap the flux emerging from the rear end of the bars making the bars to appear to be "infinite" in length. An alternative shield design would consist of individual thin-walled ferromagnetic rectangular cross-section "cups" fitted on the rear end of each bar.

To insure that the shielding does not appreciably perturb the field at the working surface of the annular bearing, the length of the bars needs to be large compared to the working gap between the rotor and stator of the annular bearing. This is not a serious constraint, since the working gaps are of order 2.0 mm so that magnet lengths greater than about 2.0 cm should satisfy this constraint.

To summarize, the invention consists of the use of magnet bars with a transverse polarization in constructing an annular bearing or conical-angular rotor or stator bearing element and then surrounding the bars at their back edges with a ferromagnetic shield (or shields). As discussed later, use of the shielding concept to increase the levitation forces will also work with vertically polarized magnet bars (e.g., the bar in FIG. 1B), but the gain in force is substantially less than the gain with horizontally polarized bars.

Computer codes based on the Mathematica® platform were written in order to quantify the improvement in levitation force over conventional designs made possible by the invention. Comparisons were made of the values of the calculated levitation force per $m^2$ for an annular levitation bearing made up from transversely polarized rectangular ferrite magnet bars (Br=0.39 Tesla) with a width in the radial direction of 0.05 meters and a length in the axial direction of 0.025 m. The mean radius of the bearing was assumed to be 0.25 m so that the gaps between the magnets at their outer edges arising from assembling them in a circular pattern would be small enough to create a minimal effect on the magnetic field at their working surface.

Figure 2A:
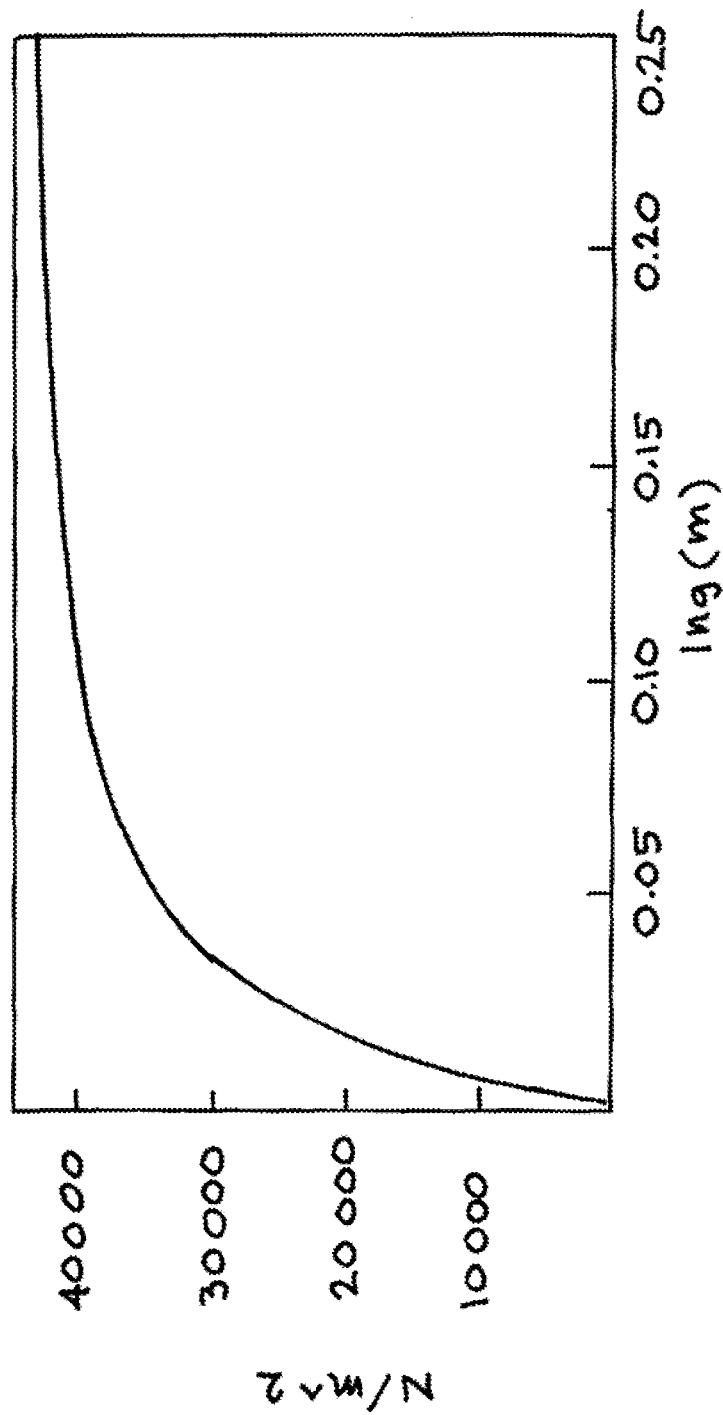
FIG. 2A shows plots of the levitation force/$m^2$ for horizontally polarized ferrite permanent magnet bars as a function of the length of the magnets.
Figure 2B:
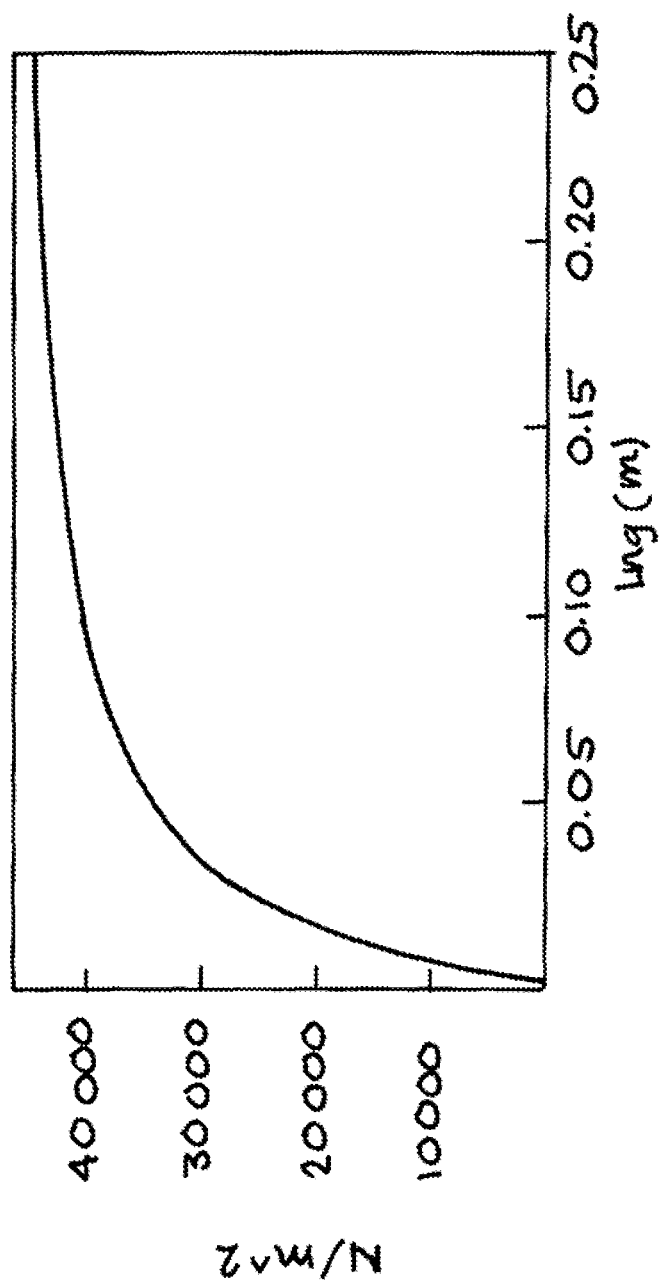
FIG. 2B shows plots of the levitation force/$m^2$ for vertically polarized ferrite permanent magnet bars as a function of the length of the magnets.

To illustrate the effect of the length of a magnet bar on the levitation force per unit area, calculations were performed for magnet bars with working surface dimensions of 0.025 m×1.0 m for both horizontally polarized bars (see e.g., FIG. 1A), and vertically polarized bars (see e.g., FIG. 1B). The magnet material in both cases is ferrite (Br=0.39 T). Graphs of the results of these calculations are shown in FIGS. 2A and 2B. The bars had no shielding at their ends in these calculations. FIG. 2A shows plots of the levitation force/$m^2$ for horizontally polarized ferrite permanent magnet bars as a function of the length of the magnets. FIG. 2B shows plots of the levitation force/$m^2$ for vertically polarized ferrite permanent magnet bars as a function of the length of the magnets.

As can be seen from the plots, the two polarizations have essentially identical force per unit area as a function of their length. As can also be seen, the lifting force per unit area for typical magnet thicknesses of 0.025 m is approximately a factor of two weaker than that for an equivalent bar reflecting the effect of the magnetic field at the infinite thickness. This factor is the grim that results in the example bars described above from the use of the ferromagnetic shield at the rear end of the magnets as described above. Because of edge effects from the relatively narrow bar width (0.025 m.) used in the calculations shown in FIGS. 2A and 2B, if wider-dimensioned bars (or stacked smaller dimension bars) are employed, the gain factors were found to be substantially increased. As an example, a magnet set made up of a close-packed stack of 7 of the bars gave a force per unit area of 46,540 N/$m^2$ with using a ferromagnetic shield, but gave only 16,830 N/$m^2$ without the shield, representing a gain factor of 2.8. For this case, the ratio of levitated weight to the weight of the rotor magnets was calculated to be 39:1, again a factor of 2.8 larger than for the case of no shield. Finally, the calculations showed that the gain factor achieved if vertically polarized bars are used instead of horizontally polarized ones is less than that for horizontally polarized ones (being limited to the gain achieved by only doubling the effective length of the bar). Thus the optimum polarization in terms of gain in force is the horizontal one.

Figure 3:
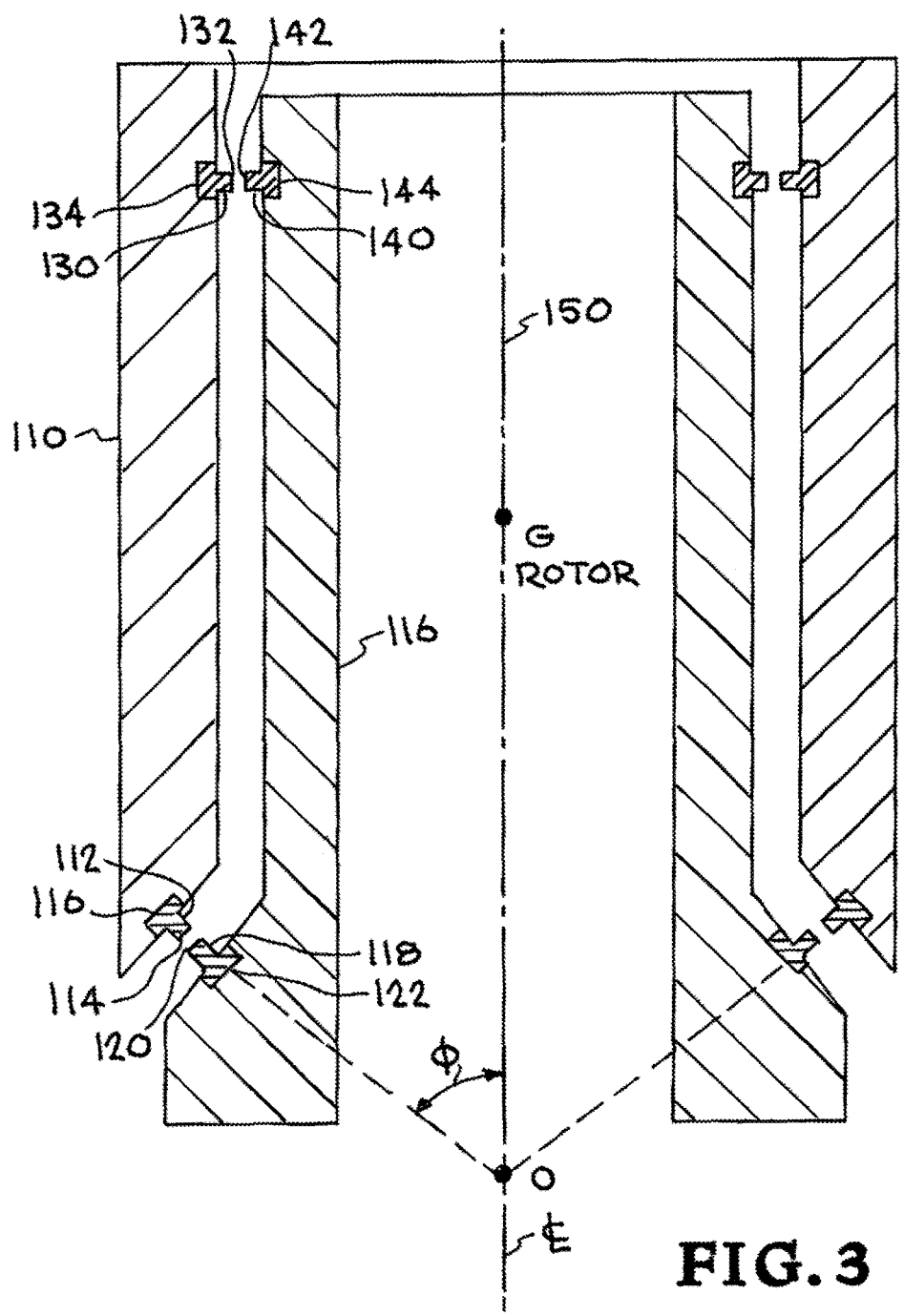
FIG. 3 shows a cross-sectional view of a passive bearing system that utilizes embodiments of the bearing elements of the present such that the system is stable against vertical (axial) and radial displacements.

FIG. 3 shows a cross-sectional view of a passive bearing system that utilizes the bearing elements of the present invention such that the system is stable against vertical (axial) and radial displacements. As shown in the figure, a vertical axis rotor 110 is being levitated by two conical repelling bearings. One bearing magnet 112 is located at the bottom of rotor 110, and the other opposing bearing magnet 118 is located on the stator 116. Bearing magnet 112 is configured such that its working surface 114 faces working surface 120 of bearing 118. The surface of bearing magnet 112 that is opposite to the working surface 114 is located in a high permeability cup (comprised e.g., of soft iron) 116 according to the present invention. Likewise, the surface of bearing magnet 118 that is opposite to the working surface 120 is located in a high permeability cup 122 according to the principles of the present invention. In this system, tilt motion is stabilized with a stabilizer located near the top of rotor 110, which stabilizer can be a conventional stabilizer as known in the art, or can be a stabilizer according to the teachings of the present invention. In one configuration, magnets 130 and 140 are arranged so that their respective working surfaces 132 and 142 (facing each other) have Amperian currents that are antiparallel, which causes them to repel each other. Similarly, in one configuration, magnets 112 and 118 are arranged so that their respective working surfaces 114 and 120 (facing each other) have Amperian currents that are antiparallel, which causes them to repel each other. The Amperian currents on the faces are perpendicular to the central axis of rotation 150. Note that the soft iron material can be substituted with other suitably high permeability materials. In one embodiment, the two facing elements have Amperian currents flowing in antiparallel directions that are perpendicular to the central axis of the system. This example will make clear to those skilled in the art that the passive magnetic bearing configurations having alternative polarization and Amperian current direction can be utilized in a variety of useful ways to provide stabilization and levitation. Note that the bearing elements and high permeability cups, as well as the stabilizer elements, are not drawn to scale and they can, e.g., be much larger to provide greater forces.

Figure 4:
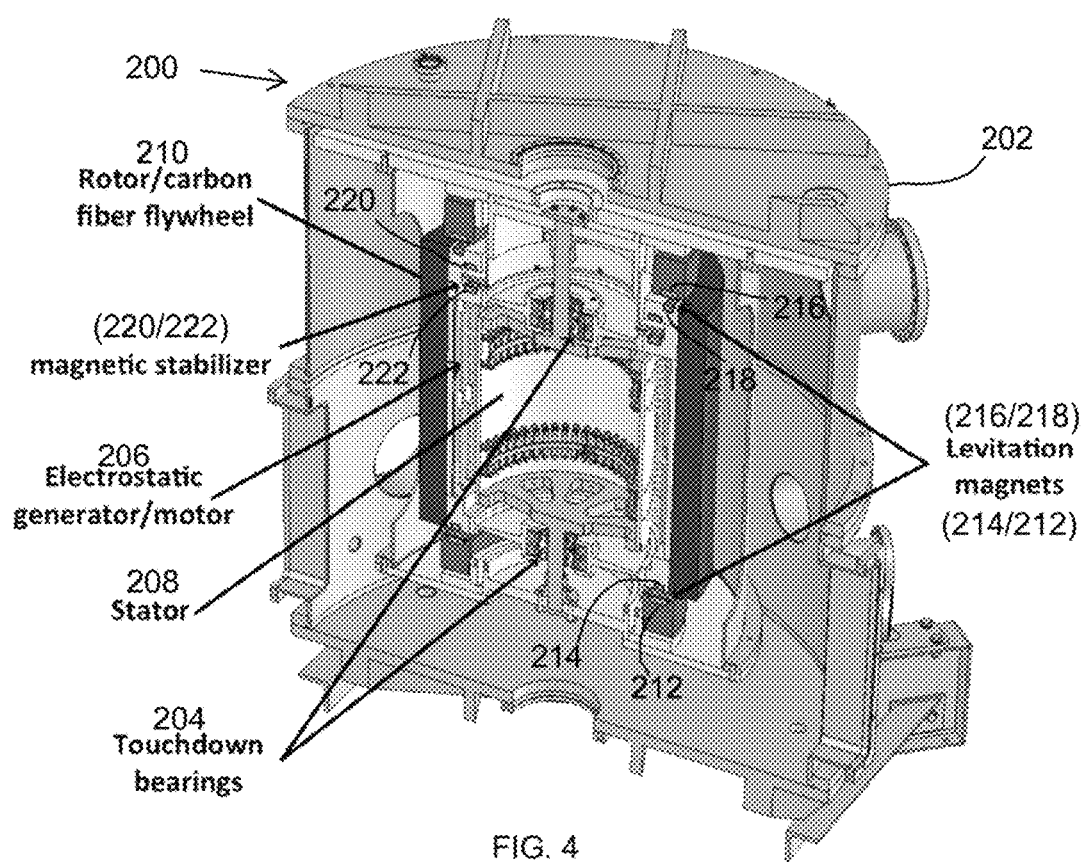
FIG. 4 shows an embodiment of an electro-mechanical battery that utilizes the magnetic elements and shields of the present invention in its levitation and stabilizer systems.

FIG. 4 shows an embodiment of an electro-mechanical battery (EMB) 200 and includes a vacuum chamber 202. The system includes conventional touchdown bearings 204. The system includes an electrostatic generator/motor 206, a description of which can be found in U.S. patent application Ser. No. 13/796,678, titled "An Improved Electrode Geometry for Electrostatic Generators and Motors" incorporated herein by reference. In that application, see FIGS. 11A and 11B and the associated description. In the present FIG. 4, there is shown a stator 208 and a rotor/carbon fiber flywheel 210. The lower levitation magnet pair comprises magnet ring 212 and magnet ring 214 which both utilize the bearing elements shown in FIG. 1A and as configured in a circle as shown in FIG. 1C. To achieve levitation, magnet ring 212 must have its Amperian current direction pointing radially either toward or away from the central axis of the stationary system and magnet ring 214 which is attached to rotor 210 must be pointing radially with respect to the central axis of rotation of the rotor and most importantly, it must be pointed in the opposite direction from that of magnet ring 212. Thus, the two ring will repel one another.

The upper levitation magnet pair of FIG. 4 comprises magnet ring 216 and magnet ring 218 which both utilize the bearing elements shown in FIG. 1A and as configured in a circle as shown in FIG. 1C. To achieve levitation, magnet ring 216 must have its Amperian current direction pointing radially either toward or away from the central axis of the stationary system and magnet ring 218 which is attached to rotor 210 must be pointing radially with respect to the central axis of rotation of the rotor and most importantly, it must be pointed in the same direction as that of magnet ring 216. Thus, the two ring will attract one another.

The system of FIG. 4 also employs a magnetic stabilizer, which can be achieved through methods known in the art, such as the use of a Halbach array magnetic stabilizer. Embodiments of the present invention can be utilized to form the stabilizer, with the advantages over the use of a Halbach array, as discussed supra. In this case, a ring 220 of magnets are attached to the stationary system. Another ring 222 of magnets, also configured as shown in FIG. 1C, are attached to rotor 210. The Amperian current directions on the working surfaces of the magnets of rings 220 and 222 are in the same direction, thus producing an attractive force between the two rings. If the rotor moves out of rotation, the upper ring 220 exerts a restoring force on ring 222.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
a permanent magnet first block having six faces (face 1, face 2, face 3, face 4, face 5 and face 6), wherein said face 1 is parallel with said face 2 and wherein each of said face 3, said face 4, said face 5 and said face 6 are perpendicular with said face 1 and said face 2, wherein said first block has a B-field magnetization polarization direction that is perpendicular to said face 5 and said face 6, wherein said first block has Amperian currents characterized as flowing on the surfaces of, and making a complete loop around said block on said face 1 and said face 3 and said face 2, and said face 4, wherein said first block is not in direct contact with any other permanent magnet block or magnetic material; and
a ferromagnetic first shield in direct contact with the entirety of only said face 2 and in only partial contact with said face 3 and said face 4 and said face 5 and said face 6, wherein said first shield has a first trough on a first side of said first shield, wherein said first trough is configured such that all of said face 2 is fit into said first trough and only a portion of said face 3 and said face 4 and said face 5 and said face 6 are fit into said first trough and are in direct contact with said first shield, wherein only the entirety of said face 1 is not in direct contact with said first shield.

2. The apparatus of claim 1, wherein said first shield traps at least a portion of the Amperian current characterized as flowing on said face 2.

3. The apparatus of claim 1, wherein said first shield reduces the field canceling effects on the Amperian current characterized as flowing on said face 2.

4. The apparatus of claim 1, wherein said ferromagnetic material comprises ferrite.

5. The apparatus of claim 1, further comprising:
a plurality of permanent magnet second blocks, wherein each second block thereof is substantially identical to said first block; and
a plurality of ferromagnetic second shields, wherein each second block of said second blocks is in direct contact with its own second shield of said second shields in the same manner that said first block is in contact with said first shield;
wherein said first block and said second blocks are arranged in a first ring, wherein said polarization direction is parallel to the azimuthal coordinate of said first ring.

6. The apparatus of claim 5, wherein s face 1 is herein referred to as the working surface, wherein the Amperian current direction at said working surface is directed toward or away from the center of said first ring.

7. The apparatus of claim 6, wherein said apparatus further comprises:
a rotor having an axis of rotation, wherein said first ring is stationary with respect to said axis of rotation and to said rotor when said rotor rotates;
a plurality of permanent magnet third blocks, wherein each third block thereof is substantially identical to said first block; and
a plurality of ferromagnetic third shields, wherein each said third block is in direct contact with its own said third shield in the same manner as said first block is in contact with said first shield;
wherein said third blocks are arranged in a second ring fixedly attached to said rotor.

8. The apparatus of claim 7, wherein each said third block comprises ferrite material.

9. The apparatus of claim 5, wherein each said second shield comprises a second trough.

10. The apparatus of claim 7, wherein each said third shield comprises a third trough.

11. An apparatus, comprising:
a rectangular permanent magnet first block having a B-field magnetization direction and further having Amperian currents that complete a loop across faces of said block, where a plane defined by said loop is perpendicular with respect to said B-field magnetization direction, wherein said first block is not in direct contact with any other permanent magnet block; and
a ferromagnetic first shield having a first trough, wherein only 5 faces of said first block are fixed into said first trough and wherein one face of said first block, herein referred to as the working face of said first block, is not fixed into said first trough.

12. The apparatus of claim 11, wherein said first shield traps at least a portion of the Amperian current characterized as flowing on the face of said first block, referred to herein as the opposing face, that is opposite to and parallel with said working face.

13. The apparatus of claim 11, wherein said first shield reduces the field canceling effects on the Amperian current characterized as flowing on the face of said first block, referred to herein as the opposing face, that is parallel to said working face.

14. The apparatus of claim 11, wherein said ferromagnetic material comprises ferrite.

15. The apparatus of claim 11, further comprising:
   a plurality of permanent magnet second blocks, wherein each second block thereof is substantially identical to said first block; and
   a plurality of ferromagnetic second shields each having its own second trough of a plurality of second troughs, wherein each said second block of said second blocks is fixed in its said own trough in the same manner that said first block is fixed in said first trough;
   wherein said first block and said second blocks are arranged in a first ring, wherein said polarization direction is about parallel to the azimuthal coordinate of said first ring.

16. The apparatus of claim 15, wherein the Amperian current direction at said working face is directed toward or away from the center of said first ring.

17. The apparatus of claim 16, wherein said apparatus further comprises:
   a rotor having an axis of rotation, wherein said first ring is stationary with respect to said axis of rotation and to said rotor when said rotor rotates;
   a plurality of permanent magnet third blocks, wherein each third block thereof is substantially identical to said first block; and
   a plurality of ferromagnetic third shields each having its own third trough of a plurality of third troughs, wherein each said third block is in fixed within its own said third trough in the same manner as said first block is in said first trough, wherein said third blocks are arranged in a second ring fixedly attached to said rotor.

18. The apparatus of claim 17, wherein each said third block comprises ferrite material.

* * * * *